United States Patent [19]

Concilio-Nolan et al.

[11] 4,058,510

[45] Nov. 15, 1977

[54] PROCESS FOR SEPARATING SODIUM LAURYL SULFATE (SLS) FROM A SLS/PROTEIN COMPLEX

[75] Inventors: Mary C. Concilio-Nolan, New York; Pei K. Chang, Montrose, both of N.Y.

[73] Assignee: Stauffer Chemical Company, Westport, Conn.

[21] Appl. No.: 582,490

[22] Filed: May 30, 1975

[51] Int. Cl.² .............................................. A23J 1/20
[52] U.S. Cl. .............................. 260/112 R; 426/271; 426/583; 426/657; 426/660
[58] Field of Search .................... 260/112 R; 426/271, 426/583, 657

[56] References Cited

U.S. PATENT DOCUMENTS

| | | | |
|---|---|---|---|
| 2,695,235 | 11/1954 | de Goode | 99/57 |
| 3,252,961 | 5/1966 | Rodgers | 260/112 R |
| 3,404,142 | 10/1968 | Shank | 260/112 R |
| 3,583,968 | 6/1971 | Pien | 260/112 R |
| 3,637,643 | 1/1972 | Wingerd | 260/112 R |
| 3,930,039 | 12/1975 | Kuipers | 260/112 R |

OTHER PUBLICATIONS

Chemical Abstracts, vol. 70, No. 56478z, Goujard, 1969.
Chem Abs., vol. 44, No. 7457d, Roeder, 1947.
Chem Abs., vol. 79, No. 52008j, Foremost-McKesson, 1973.
Chem Abs., vol. 49, No. 4204e, de Goede, 1954.
P. Jelen, Journal Dairy Science, vol. 56, No. 12, pp. 1505-1510, 1973.
Smith, Agricultural & Food Chemistry, vol. 10, No. 4, pp. 302-304, 1962.
Putnam, J. American Chemical Society, vol. 66, pp. 692-697, 1944.

*Primary Examiner*—Paul R. Michl
*Attorney, Agent, or Firm*—Richard P. Fennelly

[57] ABSTRACT

Reaction of sodium lauryl sulfate with whey proteins forms a sodium lauryl sulfate-whey protein complex. Treatment of the complex with base to bring it to a pH of either from about 5.0 to about 6.5 at a solids content of from about 5% to about 30%, by weight, and at a temperature of from about 0° C. to about 5° C. or a pH of from about 11 to about 13 at a solids content of from about 2.5% to about 10% and a temperature of from about 0° C. to about 5° C. produces a precipitate and supernatant solution. The supernatant can be used to make an egg white substitute, after reduction of its sodium lauryl sulfate content, whereas the precipitate is high in sodium lauryl sulfate and can be recycled for use as a starting reagent.

7 Claims, No Drawings

PROCESS FOR SEPARATING SODIUM LAURYL SULFATE (SLS) FROM A SLS/PROTEIN COMPLEX

TECHNICAL DESCRIPTION OF THE INVENTION

It has been proposed in U.S. application Ser. No. 582,550 filed on May 30, 1975 in the name of Pei K. Chang, entitled "Production of Egg White Substitute from Whey," that egg white substitutes are formed by reacting liquid cheese or vegetable whey with sodium lauryl sulfate to form a sodium lauryl sulfate-whey protein complex which can be used in food preparations after the sodium lauryl sulfate content has been reduced from its normal level in the complex of about 20% to 30%, by weight, to below about 1.0% by weight, preferably below about 0.5%, most preferably below about 0.1%, by weight. The preferred way to reduce the sodium lauryl sulfate level in the process described in that application is by passing the complex through an anion exchange resin.

Such resins are quite expensive and a need has therefore arisen for an alternative way to cheaply remove sodium lauryl sulfate from the sodium lauryl sulfate-whey protein complex so that an egg white substitute might be made and the recovered sodium lauryl sulfate, which is rather expensive, might be recycled for further reaction with whey, e.g., as disclosed in the above-mentioned copending application of Pei. K. Chang.

The present invention, in general terms, comprises the steps of treating of the sodium lauryl sulfate-whey complex which is described in the above-identified U.S. application of Pei K. Change with an appropriate amount of base to either bring it to a pH of from about 5.0 to about 6.5 at a solids content of from about 10% to about 30%, by weight, and at a temperature of from about 0° C. to about 5° C. or to a pH of from about 11 to about 13 at a solids content of about 2.5% to about 10% and at a temperature of from about 0° C. to about 5° C. to form a sodium lauryl sulfate rich precipitate and a supernatant which can be used to form an egg white substitute. The present invention also includes the useful products obtained by using the above-described process.

When liquid cheese whey is used as a starting material in forming the sodium lauryl sulfate-protein complex to be treated in accordance with the present invention it can be selected from a wide variety of wheys including sweet and acid wheys. Examples are cheddar, cottage, cream, Swiss, ricotta and mozzarella. Also intended to be included within the term "liquid cheese whey" are a number of whey protein concentrates. Such concentrates can be made by a number of processes including: an electrodialysis procedure (e.g., as described by Stribley, R.C., Food Processing, Vol. 24, No. 1, p. 49, 1963); by reverse osmosis; by ultrafiltration (e.g., as described by Horton, B. S. et al., Food Technol., Vol. 26, p. 30, 1972); by alcohol precipitation (e.g., Morr et al. J. Dairy Sci., Vol. 53, p. 1162, 1970); or by gel filtration. When the latter procedure is followed the starting material for use with the present invention can be the partially delactosed, demineralized product resulting from treatment of cheese whey with a divalent metal ion and adjustment of the pH to a value above 6 at a temperature below 140° F. in accordance with the teachings of U.S. Pat. No. 3,560,219 to Attebery followed by a concentration step to remove lactose. This partially delactosed liquor can alternatively be passed through the bed of a molecular sieve resin in accordance with U.S. Pat. No. Re. 27,806 to Dienst et al. to yield two fractions which can be used as starting materials in the process of the present invention. The first comprises mainly protein with residual lactose and minerals and is available commercially under the name ENRPRO ® from Stauffer Chemical Company, Food Ingredients Division, Westport Conn. It comprises 40%–80% by weight protein (N X 6.38), 10–30% lactose, 3–15% ash, 0.5–4% fat, 0.7–3.3% lactate and 0.6–1.7% citrate. The second fraction contains mainly lactose and minerals with residual protein. It is available as ENR-EX ® from Stauffer Chemical Company, Food Ingredients Division, Westport, Conn. It comprises 40–50% lactose, 25–35% minerals, 15–20% protein (N X 6.38), 7–10% lactic acid, 3–6% citric acid, less than 1% fat, and less than 5% moisture.

If vegetable whey, e.g., soy whey, cottonseed whey, or coconut whey, is intended to be used in forming the sodium lauryl sulfate-protein complex to be treated in accordance with this invention, such a complex can be prepared according to the procedures taught by A.K. Smith et al., Agricultural and Food Chemistry, Vol. 10, pp. 302–304 or those taught in the above described copending U.S. application Ser. No. 582,550 filed on even date herewith in the name of Pei K. Chang.

As described in the above-described copending application of Pei K. Chang the starting material, i.e., the sodium lauryl sulfate-protein complex, to be treated in accordance with the present invention is formed by adding to the cheese or vegetable whey an effective amount of sodium lauryl sulfate for formation of the desired complex. The complex will precipitate from solution and can be isolated. However, in order to be used in foods, it is necessary that its sodium lauryl sulfate content be substantially reduced, e.g., to not in excess of about 1.0% The present invention is directed to accomplishing such a reduction in the sodium lauryl sulfate content.

In order that the sodium lauryl sulfate content might be lowered in the complex it is necessary according to the present invention to treat the normally rather highly acidic solutions of the complex with an effective amount of base to give a pH to the solution of either from about 5.0 to about 6.5 or from about 11 to about 13, preferably either from about 5.5 to about 6.0 or from about 12 to about 13, respectively, in conjunction with the solids content and temperature values described below. Any food grade base can be used to adjust the pH such as sodium hydroxide, the preferred base, potassium hydroxide, calcium hydroxide and ammonium hydroxide. Use of pH values of below about 5.0 and from about 6.5 to about 11 does not give rise to any appreciable separation and precipitation of sodium lauryl sulfate from the complex. Use of pH values above about 13 gives rise to gel formation without any appreciable separation of sodium lauryl sulfate from the complex. The most preferred pH value for use according to this invention is about 12.5 which will result in a product containing about 80% by weight of the sodium lauryl sulfate as precipitate.

The whey solids content of the resulting solution should also be adjusted to achieve an optimum amount of precipitation. This can be done by diluting the solution with addition of water, by using dilute solutions of base when the pH of the solution is adjusted, or by any other means known to persons of ordinary skill in the art.

When the pH is to be from about 5.0 to about 6.5 the whey solids content should be from about 5% to about 30%, by weight of the solution, preferably from about 10% to about 20%. If soy whey is used, the solids content should be from about 10% to about 25%, by weight, in order to cause precipitation of sodium lauryl sulfate in those cases when the solution containing the complex is stored for up to about 18 hours at 3° C. More prolongd storage, e.g., for 72 hours, enables one to lower the solids content of the solution, e.g., to about 5%. When the pH values are to be from about 11 to about 13, the solids content should range from about 2.5% to about 10%, preferably from about 2.5% to about 6%, for the cheese wheys formed from the partially delactosed cheese whey mother liquor, as described above, and from about 8% to about 10% for all other wheys. Use of these solids content values will prevent undesired gel formation in the solution.

The final condition that must be satisfied is the adjustment of the solution to a temperature of from about 0° C. to about 5° C., preferably from about 0° C. to about 1° C., in conjunction with the above described pH and solids content values, to precipitate a major amount of the sodium lauryl sulfate from the complex. This can be done by cooling the solution to this temperature either before, during or after either of the process steps of pH adjustment or solids content adjustment.

The precipitated material can be recycled, and it contains about 70-80% sodium lauryl sulfate with the remainder being protein and ash. This product when resolubilized can be used as a starting reagent to form additional sodium lauryl sulfate-whey protein complexes. The supernatant can then be treated, if desired, with an anionic exchange resin, as described in the above-mentioned copending application of Pei K. Chang to remove the small amount of sodium lauryl sulfate remaining in the complex. Using the resin to remove only this small residual content will enable the expensive resin to be used for a much longer period of time than would be possible if it were to be utilized to remove the major amount of the sodium lauryl sulfate.

The present invention is further illustrated by the following Examples:

EXAMPLE 1

This Example shows the treatment of a sodium lauryl sulfate-soy protein complex in accordance with the present invention and particularly illustrates the formation of a sodium lauryl sulfate-rich precipitate.

Twelve liters of soy whey were treated in accordance with the procedure described by Smith, A. K. et al. as described in Agricultural and Food Chemistry, Vol. 10, pp. 302-304. Two thousand grams of soy flour, available commercially as Soya Fluff 200 W from Central Soya, was dispersed in about 18 liters of water with a mechanical stirrer. The pH was adjusted to 7.5 using 4N sodium hydroxide. The mixture was stored under refrigeration for about 18 hours. The supernatant soy whey was collected with the aid of centrifuging at 2000 rpm following pH adjustment to 4.5 and standing under refrigeration for 18 hours. The pH of the soy whey was further lowered to 3.5. Thirty-two grams of sodium lauryl sulfate, commercially available as Duponol C from Du Pont, was dispersed in the soy whey at 25°-30° C. with the aid of a mechanical mixer. Precipitation occurred immediately. The supernatant was separated and discarded from the precipitate by centrifugation at 2000 rpm. The pH of the slurry which contained the whey protein/sodium lauryl sulfate complex was adjusted to 5.7 using 1N sodium hydroxide, and the solids content was determined to be 20%. It was stored at a temperature of 3° C. overnight and was centrifuged at 15,000 rpm for 15 minutes at 5°-10° C. The SLS precipitate was separated from the supernatant, and was washed with ice water (about 0°-1° C). Both the SLS precipitate and the supernatant were freeze dried. Tale I sets forth the analysis of the fractions for sodium lauryl sulfate content:

Table 1

| Fraction | % SLS (by weight) |
|---|---|
| 1. SLS-Precipitate | |
| A. As is | 51 |
| B. After ice water wash | 83.2 |
| 2. Supernatant | 25.9 |

These data indicate the precipitate contains 83.2% sodium lauryl sulfate which can be recycled.

EXAMPLE 2

A modified whey product formed according to the teachings of U.S. Pat. No. Re. 27,806, and available as ENRPRO ® 50 from Stauffer Chemical Company, was treated with sodium lauryl sulfate to form a sodium lauryl sulfate-protein complex.

About 2000 grams of this whey product was dissolved in 14 liters of water and 350 g. of sodium lauryl sulfate was added. The pH was adjusted to 3.5 by addition of hydrochloric acid, and the mixture was stored under refrigeration for about 18 hours, the supernatant was decanted, and the caked precipitate of sodium lauryl sulfate-protein complex was washed twice with water in a 1:5 volume ratio. The precipitate was allowed to stand for about 18 hrs. under refrigeration between each wash to allow for complete settling. The precipitate was removed.

The precipitate containing the sodium lauryl sulfate/modified whey protein complex was diluted with water to a solids content of about 20% by weight. The pH was adjusted to 6.2, and the solution was stored at 3° C. overnight. It was centrifuged at 15,000 rpm for 5 minutes at 5°-10° C., and the precipitate and supernatant were separated. The precipitate was washed with ice water and all fractions were freeze dried.

Table 2 sets forth the analysis for sodium lauryl sulfate in all fractions.

Table 2

| Fraction | SLS Content (% by weight) |
|---|---|
| 1. Precipitate | |
| a. As is | 55.6 |
| b. Washed with ice water | 82.6 |
| 2. Supernatant | 29.5 |

This Example also illustrates the formation of a sodium lauryl sulfate-rich precipitate.

EXAMPLE 3

This Example shows use of the present invention in removing sodium lauryl sulfate from a modified whey product sodium lauryl sulfate (SLS) complex as in Example 2.

The modified whey product was treated with SLS at a ratio of 0.35 to 0.40 based on the weight of SLS to the weight of protein in whey at a pH of 3.5. A precipitate containing about 95-100% of the total protein in whey was recovered. It was washed with between one and three volumes of water. The resulting complex was adjusted to a pH of about 12.5, a solids content of about 5% and was cooled to 0°-1° C. to precipitate about 80% of the SLS. The supernatant was then passed through and anion exchange resin (mixed resin in hydroxy and chloride form, pH=6.0) to yield the desired product of this invention.

EXAMPLE 4

This Example illustrates the formation of a hard egg meringue prepared from treating the sodium lauryl sulfate-protein complex of Example 3 with base to adjust the pH to about 12.5, a solids content of about 5%, followed by cooling to 0°-1° C. and isolation of the supernatant. This supernatant, was then passed through an anion exchange resin, was neutralized and was freeze dried to yield the desired product of the claimed process, which was used to replace 50% of the dry egg albumen normally used. Monocalcium phosphate, anhydrous, was added to provide divalent calcium ions which enhance the heat sensitivity of the product. The following formulation was used:

| Ingredient | Sample No. (Content in grams) | |
|---|---|---|
| | 1 | 2 |
| Dry egg albumen (Henningsen, P-11) | 15 | 7.5 |
| Monocalcium phosphate, anhydrous | 0.52 | 0.52 |
| Product of the Invention | — | 7.5 |
| Sugar | 297 | 297 |
| Water | 135 | 135 |

The procedure for making the meringue was:

1. The dry egg albumen (and, in Sample No. 2, the product of this invention) were dissolved in the required amount of water, and the monocalcium phosphate, anhydrous was added. This was mixed for 30 min. and added to the small bowl of a Hamilton Beach mixer;
2. Sugar was added slowly for two minutes while beating at speed No. 10;
3. The mixing was continued so that the total mixing time was six minutes; and
4. The mixture was baked at 275° F. for 30 minutes in a home range-type oven.

The evaluation of the meringues was:

No. 1. This is the control and was a hard shell meringue having very white, stiff peaks with no evidence of collapsing. The foam's specific gravity was 0.359 and its pH, 5.9.

No. 2. This was a hard shell meringue quite similar to the control. It had very high, firm white peaks and no evidence of collapsing. The foam's specific gravity was 0.370 and its pH, 5.5.

EXAMPLE 5

The formation of scrambled eggs using the product from this process as well as other whey products was performed.

Product A

This was formed by reacting about 350 grams of SLS with 2000 grams of the modified whey product used in Example 2 in 14 liters of water to form a precipitate which was washed with distilled water (1 to 3 volume measures), was adjusted to a pH of about 5.7 to 7.0 and was passed through an anion exchange resin (Duolite A-102D), neutralized and dried.

Product B

This product was formed by dispersing the complex (5%) used in making Product A and treating it to a pH adjustment with 1N NaOH so that its pH was about 12.5. It was cooled to 0° -1° C to yield a supernatant that was passed through an anion exchange resin, neutralized and dried. This is the product of the process of this invention.

Product C

Acid whey was reacted with SLS (about 0.24%, weight on volume of acid whey) to yield a precipitate in a solution having a pH of about 3.5 to 4.0. The pH was adjusted to about 6, and the solution was passed through an anion exchange resin (Duolite A-102D) to yield a eluant having a pH of about 12. The eluant was neutralized and was freeze dried.

The following ingredients were used to make the scrambled eggs:

| Ingredient | Sample No. | | | |
|---|---|---|---|---|
| | 1 | 2 | 3 | 4 |
| Egg white (liq.) | 66ml | 33ml | 33ml | 33ml |
| Egg yolks (liq.) | 33ml | 33ml | 33ml | 33ml |
| Product A | — | 4.0g | — | — |
| Product B | — | — | 4.0g | — |
| Product C | — | — | — | 4.0g |
| Water | — | 33ml | 33ml | 33ml |

The above ingredients were cooked in one teaspoon of non-salted butter for 2.5 minutes at No. 4 setting on a range-type stove. All samples appeared identical. The one containing Product C most closely resembled the one containing the egg white and yolk in texture and flavor. The samples containing Products A and B were acceptable although they had a slightly softer texture and a slightly saltier taste.

EXAMPLE 6

Products A, B and C from Example 5 were evaluated for use in forming divinity candy as a 50% egg albumen replacer, by weight. Product C was also used as a 100% replacer.

The following ingredients were used (all in amount in grams).

| Ingredients | Sample No. | | | | |
|---|---|---|---|---|---|
| | 1 | 2 | 3 | 4 | 5 |
| Dry egg albumen (Henningsen, P-20) | 8.4 | 4.2 | 4.2 | 4.2 | — |
| Monocalcium phosphate, anhydrous | 0.29 | 0.29 | 0.29 | 0.29 | 0.58 |
| Product A | — | 4.2 | — | — | — |
| Product B | — | — | 4.2 | — | — |
| Product C | — | — | — | 4.2 | 8.4 |
| Corn Syrup | 217 | 217 | 217 | 217 | 217 |
| Sucrose | 497 | 497 | 497 | 497 | 497 |
| Salt | 1.5 | 1.5 | 1.5 | 1.5 | 1.5 |
| Vanilla | 2.2 | 2.2 | 2.2 | 2.2 | 2.2 |
| Water | 171.6 | 171.6 | 171.6 | 171.6 | 171.6 |

The divinity candy was formed as follows:

1. The sugar, corn syrup, salt and 112 ml. of water were combined and were heated without stirring to 265° F.;
2. The dry egg albumen and/or Products A-C, and monocalcium phosphate, anhydrous were dissolved in the remaining water and were whipped until stiff at speed 10 in a Kitchen Aid mixer. The specific gravity of the foam was checked at this point;

3. The hot syrup from step 1 was added to the foam from step 2 in a steady stream over a period of 2 minutes under mixing at speed 8. The speed was then changed to 10 and the whipping was continued until the candy lost its gloss. This took about 6 min. The vanilla was then beaten in;

4. The mixture was poured onto greased wax paper in a pan and was weighed. It was cooled and the specific volume and hardness were evaluated.

The following physical characteristics were noted:

| Sample No. | Foam Sp. Grav. | Candy Sp. Vol. | Candy Hardness (mm)* |
|---|---|---|---|
| 1(Control) | — | 0.99 | 4.6 |
| 2 | 0.078 | 1.17 | 1.6 |
| 3 | 0.059 | 1.08 | 4.1 |
| 4 | 0.078 | 1.05 | 17.0 |
| 5 | 0.078 | 0.87 | 12.9 |

*this indicates the distance in mm. of penetration of a penetrometer cone loaded with 20 grams. The lower the number, the harder the candy.

The candy samples 4 and 5 had a thick gummy texture and was unacceptable as a divinity candy. Samples 2 and 3 had a better flavor and texture than the control but were slightly drier in taste. Samples 2 and 3 produced a candy having an equal or higher specific volume and equal or greater hardness than the control. They were, however, acceptable.

EXAMPLE 7

Products A, B and C were tested to determine the applicability of these products in acid beverages. Each was added to "Teem" (pH=3.0) at a 0.25% level based on the weight of protein. Only Product B, the product of this invention, remained soluble when added to the soda. The other two precipitated.

EXAMPLE 8

This Example demonstrates that the process of the present invention does not significantly lower the nutritional value of the modified whey protein contained in the supernatant solution. A sample of Product B, as described in Example 5 and the modified whey product used as a starting material in Example 2 were analyzed. The following Table sets forth their amino acid content (in mg/gm protein):

| Amino Acid | Product B | Ex. 2 Protein |
|---|---|---|
| Lysine* | 97.5 | 98.1 |
| Threonine* | 57.1 | 66.7 |
| Cystine | 19.2 | 23.7 |
| Valine* | 61.2 | 63.9 |
| Methionine* | 20.3 | 23.3 |
| Isoleucine* | 53.2 | 55.1 |
| Leucine* | 134.6 | 115.3 |
| Tyrosine | 33.9 | 27.0 |
| Phenylalanine* | 42.9 | 32.5 |
| Tryptophan* | 18.8 | 16.5 |

*designates an essential amino acid.

The Examples given above illustrates certain preferred embodiments of the present invention. The scope of protection that is desired is set forth in the pending claims.

What is claimed:

1. A process for treating a sodium lauryl sulfate-whey protein complex to form an egg white substitute with recovery of the sodium lauryl sulfate which comprises either (a) adjusting the pH and solids content of the solution containing the complex to from about 5.0 to about 6.5 and from about 5% to about 30%, by weight, respectively, at a temperature of about 0° C. to about 5° C. or (b) adjusting the pH and solids content of the solution containing the complex to from about 11 to about 13 and from about 2.5% to about 10%, by weight, respectively, at a temperature of from about 0° C. to about 5° C. to thereby form a sodium lauryl sulfate-rich precipitate and a supernatant solution and separating the precipitate and supernatant solution.

2. A process as claimed in claim 1 wherein the pH in (b) is from about 12 to about 13.

3. A process as claimed in claim 1 wherein the pH in (a) is from about 5.5 to about 6.0.

4. A process as claimed in claim 2 wherein the solids content in (b) is from about 2.5% to about 6%.

5. A process as claimed in claim 3 wherein the solids content is from about 10% to about 20%.

6. A process as claimed in claim 1 wherein the temperature in (a) or (b) is from about 0° C. to 1° C.

7. A process as claimed in claim 1 which further comprises recycling the precipitate for use in forming additional sodium lauryl sulfate-whey protein complexes.

* * * * *